US011778403B2

(12) United States Patent
Joyner et al.

(10) Patent No.: US 11,778,403 B2
(45) Date of Patent: Oct. 3, 2023

(54) PERSONALIZED HRTFS VIA OPTICAL CAPTURE

(71) Applicant: Dolby Laboratories Licensing Corporation, San Francisco, CA (US)

(72) Inventors: McGregor Steele Joyner, Alameda, CA (US); Alex Brandmeyer, Berkeley, CA (US); Scott Daly, Kalama, WA (US); Jeffrey Ross Baker, Thousand Oaks, CA (US); Andrea Fanelli, Oakland, CA (US); Poppy Anne Carrie Crum, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 483 days.

(21) Appl. No.: 17/263,125

(22) PCT Filed: Jul. 25, 2019

(86) PCT No.: PCT/US2019/043401
§ 371 (c)(1),
(2) Date: Jan. 25, 2021

(87) PCT Pub. No.: WO2020/023727
PCT Pub. Date: Jan. 30, 2020

(65) Prior Publication Data
US 2021/0211825 A1 Jul. 8, 2021

Related U.S. Application Data

(60) Provisional application No. 62/703,297, filed on Jul. 25, 2018.

(51) Int. Cl.
*H04R 5/02* (2006.01)
*H04S 7/00* (2006.01)
(Continued)

(52) U.S. Cl.
CPC ............ *H04S 7/301* (2013.01); *G06F 18/214* (2023.01); *G06T 7/11* (2017.01); *G06T 7/70* (2017.01);
(Continued)

(58) Field of Classification Search
CPC . H04S 7/301; H04S 1/002; G06T 7/11; G06T 7/70; G06V 40/10; G06F 18/214
See application file for complete search history.

(56) References Cited

U.S. PATENT DOCUMENTS 6,996,244 B1 2/2006 Slaney
7,664,272 B2 2/2010 Terai
(Continued)

FOREIGN PATENT DOCUMENTS

CN 106231528 B 11/2017
CN 107786936 A 3/2018
(Continued)

OTHER PUBLICATIONS

Bilinski, P. et al "HRTF Magnitude Synthesis via Sparse Representation of Anthropometric Features" Jul. 2014, ICASSP, pp. 1-5.
(Continued)

*Primary Examiner* — Simon King

(57) ABSTRACT

An apparatus and method of generating personalized HRTFs. The system is prepared by calculating a model for HRTFs described as the relationship between a finite example set of input data, namely anthropometric measures and demographic information for a set of individuals, and a corresponding set of output data, namely HRTFs numerically simulated using a high-resolution database of 3D scans of the same set of individuals. At the time of use, the system queries the user for their demographic information, and then from a series of images of the user, the system detects and measures various anthropometric characteristics. The sys-
(Continued)

tem then applies the prepared model to the anthropometric and demographic data as part of generating a personalized HRTF. In this manner, the personalized HRTF can be generated with more convenience than by performing a high-resolution scan or an acoustic measurement of the user, and with less computational complexity than by numerically simulating their HRTF.

23 Claims, 4 Drawing Sheets

(51) Int. Cl.
    *G06T 7/11*     (2017.01)
    *G06T 7/70*     (2017.01)
    *H04S 1/00*     (2006.01)
    *G06V 40/10*     (2022.01)
    *G06F 18/214*     (2023.01)

(52) U.S. Cl.
    CPC .............. *G06V 40/10* (2022.01); *H04S 1/002* (2013.01); *H04S 7/303* (2013.01); *G06T 2207/20081* (2013.01); *G06T 2207/20084* (2013.01); *G06T 2207/20132* (2013.01); *G06T 2207/30196* (2013.01); *H04S 2400/15* (2013.01); *H04S 2420/01* (2013.01)

(56) References Cited

U.S. PATENT DOCUMENTS

| | | | |
|---|---|---|---|
| 9,030,545 B2 | 5/2015 | Pedersen | |
| 9,237,398 B1 | 1/2016 | Algazi | |
| 9,544,706 B1 | 1/2017 | Hirst | |
| 9,569,073 B2 | 2/2017 | Tan | |
| 9,681,250 B2 | 6/2017 | Luo | |
| 9,788,135 B2 | 10/2017 | Romigh | |
| 9,900,722 B2 | 2/2018 | Bilinski | |
| 9,955,279 B2 | 4/2018 | Riggs | |
| 10,028,070 B1* | 7/2018 | Gamper | H04S 7/302 |
| 2012/0183161 A1 | 7/2012 | Agevik | |
| 2015/0312694 A1* | 10/2015 | Bilinski | H04S 7/301 381/1 |
| 2018/0091921 A1 | 3/2018 | Silva | |
| 2018/0249275 A1* | 8/2018 | Ghorbal | H04S 7/307 |
| 2018/0270603 A1* | 9/2018 | Gamper | H04R 5/033 |

FOREIGN PATENT DOCUMENTS

| | | |
|---|---|---|
| WO | 2012104297 A1 | 8/2012 |
| WO | 2017041922 A1 | 3/2017 |
| WO | 2017116308 A1 | 7/2017 |
| WO | 2017158232 A1 | 9/2017 |

OTHER PUBLICATIONS

Dalal, N. et al Histograms of Oriented Gradients for Human Detection, International Conference on Computer Vision & Pattern Recognition (CVPR '05), Jun. 2005, San Diego, United States, pp. 886-893.

Nill, N. B. et al "Objective Image Quality Measure Derived from Digital Image Power Spectra" Optical Engineering, Apr. 1992, vol. 31 No. 4, pp. 813-825.

Spagnol, S. et al "Automatic Extraction of Pinna Edges for Binaural Audio Customization" IEEE Multimedia Signal Processing, 15th International workshop, Nov. 2013, pp. 301-306.

Spagnol, S. et al. "Synthetic Individual Binaural Audio Delivery by Pinna Image Processing" International Journal of Pervasive Computing and Communications, Aug. 1, 2014.

Zotkin, D. et al "HRTF Personalization Using Anthropometric Measurements" IEEE workshop Applications of Signal processing to Audio and Acoustics, Oct. 19-22, 2003.

\* cited by examiner

PERSONALIZED HRTFS VIA OPTICAL CAPTURE

CROSS REFERENCE TO RELATED APPLICATIONS

The present application claims the benefit of U.S. Provisional App. No. 62/703,297 filed Jul. 25, 2018 for "Method and Apparatus to Personalized HRTF via Optical Capture", which is incorporated herein by reference.

FIELD

The present disclosure relates to audio processing, and in particular, to generating custom audio according to the listener's anthropometric and demographic characteristics.

BACKGROUND

Unless otherwise indicated herein, the approaches described in this section are not prior art to the claims in this application and are not admitted to be prior art by inclusion in this section.

By placing sound at various positions and recording through a dummy head, one can achieve, via the playback of such recordings through headphones, the perception of sound coming from the corresponding various positions relative to the listener. This approach has the unwanted side effect of causing muffled sounds if standalone loudspeakers are used instead of headphones, so often the technique is used for selected tracks of a multi-track recording, rather than the entire recording. To improve the technique, the dummy material may include the shapes of the ears (pinna) and may be designed to match the acoustic reflectance/absorbance of real heads and ears.

Alternatively, a head related transfer function (HRTF) can be applied to sound sources, so that when listened to with headphones the sounds will appear to be spatially located. In general, the HRTF corresponds to an acoustic transfer function between a point in three-dimensional (3D) space and the entrance of the ear canal. The HRTF arises from the passive filtering functions of the ear, head and body, and is ultimately used by the brain to infer a sound's location. The HRTF consists of a magnitude and phase frequency response, as a function of the elevation and azimuth (rotation around listener), applied to an audio signal. Rather than recording sounds at specific locations around the dummy head, sounds can be recorded numerous ways including conventional approaches and then processed with an HRTF to appear at desired locations. Of course, superposition allows many sounds to be created at various positions simultaneously to replicate either real-world audio environments or simply artistic intentions. In addition, sounds can be digitally synthesized instead of recorded.

Improvements to the HRTF concept include recording from the ear canals of actual humans.

SUMMARY

In the process of improving HRTFs by recording from the ear canals of actual humans, it was realized that there is strong variability in the HRTF from one person to the next, attributed to individual differences in anatomy, such as shoulder bulk, head size, and shape of the pinna, and other facial characteristics. In addition, there are minor differences between the left and right ears for a single individual. Because of this individual behavior of HRTFs, problems remain when using generic HRTFs such as those designed from dummy heads, single individuals, or averages across many individuals. The use of generic HRTFs typically leads to positional accuracy problems such as difficulty in placing sound in front of the face, front-back reversals, conveying specific distances from the head, and angular accuracy.

Furthermore, generic HRTFs have commonly been found lacking in timbral or spectral naturalness and the overall percept of depth in the sound stage. As a result of this increased understanding, there are ongoing efforts to obtain HRTFs for the specific listener via a variety of techniques.

This document describes systems for personalizing the playback of binaural audio to substantially improve the accuracy of the positions of perceived sound sources. In addition to demographic information provided by the user, the system uses an optical image capture of the user's anthropometrics such as shoulder, head, and pinna shapes. These data are used to derive a personalized HRTF for the user. This personalized HRTF is then used to process a sound source which is represented as positionalized sound objects, where the positions can range from a pinpoint location to a diffuse source (e.g., using audio objects as in the Dolby® Atmos™ system). In some embodiments, the sound source can be a multi-channel format or even a stereo source converted to positionalized sound objects. The sound source can be for video, music, dialogue enhancement, video gaming, virtual reality (VR) and augmented reality (AR) applications, etc.

According to an embodiment, a method generates head-related transfer functions (HRTFs). The method includes generating an HRTF calculation system, and generating a personalized HRTF for a user using the HRTF calculation system. Generating the HRTF calculation system includes measuring a plurality of 3D scans of a plurality of training subjects, generating a plurality of HRTFs for the plurality of training subjects by performing acoustic scattering calculations on the plurality of 3D scans, collecting generative data of the plurality of training subjects, and performing training of the HRTF calculation system to transform the generative data to the plurality of HRTFs. Generating the personalized HRTF includes collecting generative data of the user, and inputting the generative data of the user to the HRTF calculation system to obtain the personalized HRTF.

Performing the training may comprise using linear regression with Lasso regularization.

The generative data of the user may comprise at least one of anthropometric measurements and demographic data.

The anthropometric measurements may be obtained by collecting a plurality of images of the user, and using the plurality of images to determine the anthropometric measurements. Using the plurality of images to determine the anthropometric measurements may be performed using a convolutional neural network. The method may further comprise scaling the anthropometric measurements of the user using a reference object in at least one image of the plurality of images of the user.

The method may further comprise generating an audio output by applying the personalized HRTF to an audio signal.

The method may further comprise storing, by a server device, the personalized HRTF; and transmitting, by the server device, the personalized HRTF to a user device, wherein the user device generates an audio output by applying the personalized HRTF to an audio signal.

The method may further comprise generating, by a user device, an audio output by applying the personalized HRTF to an audio signal, wherein the user device includes one of a headset, a pair of earbuds, and a pair of hearables.

An audio signal may comprise a plurality of audio objects that includes position information, and the method may further comprise generating a binaural audio output by applying the personalized HRTF to the plurality of audio objects.

According to another embodiment, a non-transitory computer readable medium stores a computer program that, when executed by a processor, controls an apparatus to execute processing including one or more of the methods discussed above.

According to another embodiment, an apparatus generates head-related transfer functions (HRTFs). The apparatus includes at least one processor and at least one memory. At least one processor is configured to control the apparatus to generate an HRTF calculation system and to generate a personalized HRTF for a user using the HRTF calculation system. Generating the HRTF calculation system includes measuring a plurality of 3D scans of a plurality of training subjects, generating a plurality of HRTFs for the plurality of training subjects by performing acoustic scattering calculations on the plurality of 3D scans, collecting generative data of the plurality of training subjects, and performing training of the HRTF calculation system to transform the generative data to the plurality of HRTFs. Generating the personalized HRTF includes collecting generative data of the user, and inputting the generative data of the user to the HRTF calculation system to obtain the personalized HRTF.

The generative data of the user may comprise at least one of anthropometric measurements and demographic data, and the apparatus may further comprise a user input device that is configured to collect a plurality of images of the user, and to use the plurality of images of the user to determine the anthropometric measurements of the user, wherein the anthropometric measurements of the user are scaled using a reference object in at least one image of the plurality of images of the user.

The apparatus may further comprise a user output device that is configured to generate an audio output by applying the personalized HRTF to an audio signal.

The apparatus may further comprise a server device that is configured to generate the HRTF calculation system, to generate the personalized HRTF, to store the personalized HRTF, and to transmit the personalized HRTF to a user device, wherein the user device is configured to generate an audio output by applying the personalized HRTF to an audio signal.

The apparatus may further comprise a user device that is configured to generate an audio output by applying the personalized HRTF to an audio signal, wherein the user device includes one of a headset, a pair of earbuds, and a pair of hearables.

An audio signal may comprise a plurality of audio objects that includes position information, wherein the at least one processor is configured to control the apparatus to generate a binaural audio output by applying the personalized HRTF to the plurality of audio objects.

The apparatus may further comprise a server device that is configured to generate the personalized HRTF for the user using the HRTF calculation system, wherein the server device executes a photogrammetry component, a contextual transformation component, a landmark detection component, and an anthropometry component. The photogrammetry component is configured to receive a plurality of structural imagery of the user, and to generate a plurality of camera transforms and a structural image set using a structure-from-motion technique. The contextual transformation component is configured to receive the plurality of camera transforms and the structural image set, and to generate a transformed plurality of camera transforms by translating and rotating the plurality of camera transforms using the structural image set. The landmark detection component is configured to receive the structural image set and the transformed plurality of camera transforms, and to generate a 3D landmark set that corresponds to anthropometric landmarks of the user identified using the structural image set and the transformed plurality of camera transforms. The anthropometry component is configured to receive the 3D landmark set, and to generate anthropometric data from the 3D landmark set, wherein the anthropometric data corresponds to a set of distances and angles measured between individual landmarks of the 3D landmark set. The server device is configured to generate the personalized HRTF for the user by inputting the anthropometric data into the HRTF calculation system.

The apparatus may further comprise a server device that is configured to generate the personalized HRTF for the user using the HRTF calculation system, wherein the server device executes a scale measurement component. The scale measurement component is configured to receive scale imagery that includes an image of a scale reference, and to generate a homologue measure. The server device is configured to scale structural imagery of the user using the homologue measure.

The apparatus may further comprise a server device that is configured to generate the personalized HRTF for the user using the HRTF calculation system, wherein the server device executes a landmark detection component, a 3D projection component, and an angle and distance measurement component. The landmark detection component is configured to receive a cropped image set of anthropometric landmarks of the user, and to generate a set of 2D coordinates of the set of anthropometric landmarks of the user from the cropped image set. The 3D projection component is configured to receive the set of 2D coordinates and a plurality of camera transforms, and to generate a set of 3D coordinates that correspond to the set of 2D components of each of the anthropometric landmarks in 3D space using the camera transforms. The angle and distance measurement component is configured to receive the set of 3D coordinates, and to generate anthropometric data from the set of 3D coordinates, wherein the anthropometric data correspond to angles and distances of the anthropometric landmarks in the set of 3D coordinates. The server device is configured to generate the personalized HRTF for the user by inputting the anthropometric data into the HRTF calculation system.

The HRTF calculation system may be configured to train a model that corresponds to one of a left-ear HRTF and a right-ear HRTF, wherein the personalized HRTF is generated by using the model to generate one of a left-ear personalized HRTF and a right-ear personalized HRTF, and by using a reflection of the model to generate the other of the left-ear personalized HRTF and the right-ear personalized HRTF.

The apparatus may further comprise a server device that is configured to generate the personalized HRTF for the user using the HRTF calculation system, wherein the server device executes a data compilation component. The data compilation component is configured to implement graceful degradation of the generative data to fill in a missing portion of the generative data using an estimate determined from known portions of the generative data.

The apparatus may further comprise a server device that is configured to generate the HRTF calculation system, wherein the server device executes a dimensionality reduction component. The dimensionality reduction component is configured to reduce a computational complexity of performing the training of the HRTF calculation system by performing principal component analysis on the plurality of HRTFs for the plurality of training subjects.

The apparatus may further comprise a server device that is configured to generate the personalized HRTF for the user using the HRTF calculation system, wherein the server device executes a photogrammetry component. The photogrammetry component is configured to receive a plurality of structural imagery of the user, to perform a constrained image feature search using a facial landmark detection process on the plurality of structural imagery, and to generate a plurality of camera transforms and a structural image set using a structure-from-motion technique and a result of the constrained image feature search.

The apparatus may further comprise a server device that is configured to generate the personalized HRTF for the user using the HRTF calculation system, wherein the server device executes a contextual transformation component. The contextual transformation component is configured to receive a first plurality of camera transforms, a plurality of facial landmarks and a scale measure, to translate and rotate the plurality of camera transforms using the plurality of facial landmarks to generate a second plurality of camera transforms, and to scale the second plurality of camera transforms using the scale measure.

The apparatus may further comprise a server device that is configured to generate the personalized HRTF for the user using the HRTF calculation system, wherein the server device executes a scale measurement component. The scale measurement component is configured to receive range imaging information and to generate a homologue measure using the range imaging information. The server device is configured to scale structural imagery of the user using the homologue measure The apparatus may further comprise a user input device and a server device. The user input device is associated with a speaker and a microphone. The server device is configured to generate the personalized HRTF for the user using the HRTF calculation system, wherein the server device executes a scale measurement component. The scale measurement component is configured to receive time of arrival information from the user input device and to generate a homologue measure using the time of arrival information, wherein the time of arrival information is related to a sound output by the speaker at a first location and received by the microphone at a second location, wherein the first location is associated with the user and the second location is associated with the user input device. The server device is configured to scale structural imagery of the user using the homologue measure.

The apparatus may further comprise a server device that is configured to generate the personalized HRTF for the user using the HRTF calculation system, wherein the server device executes a cropping component and a landmark detection component. The cropping component and the landmark detection component are coordinated to implement a constrained and recursive landmark search by cropping and detecting multiple different sets of landmarks.

The apparatus may include similar details to those discussed above regarding the method.

The following detailed description and accompanying drawings provide a further understanding of the nature and advantages of various implementations.

DETAILED DESCRIPTION

Figure 2:
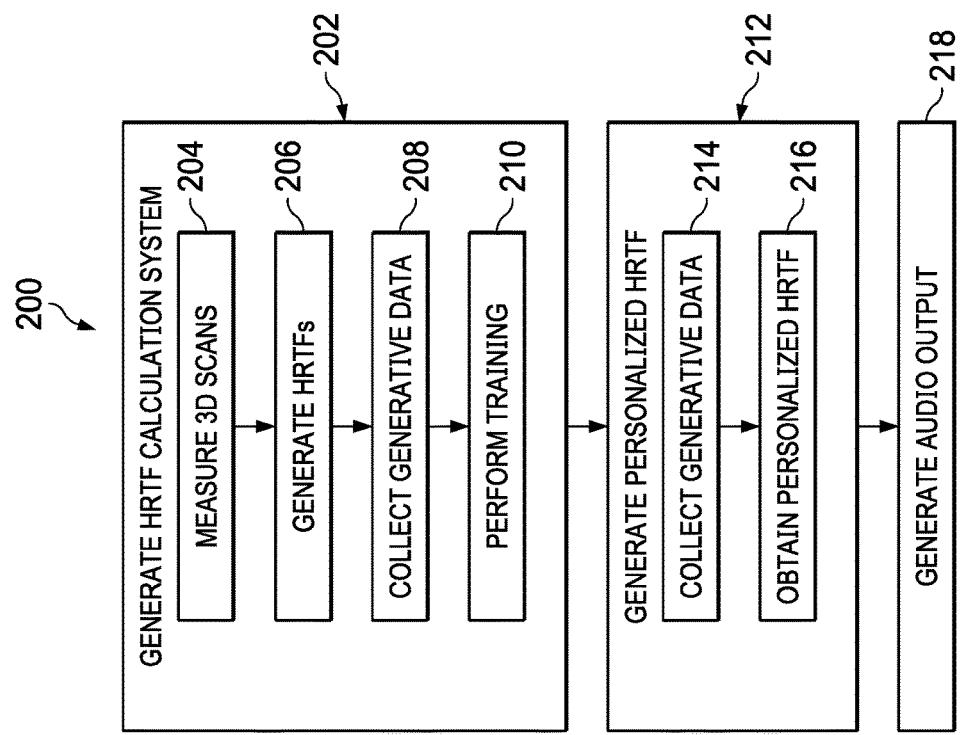
FIG. 2 is a flowchart of a method 200 of generating head-related transfer functions (HRTFs).

Described herein are techniques for generating head-related transfer functions (HRTFs). In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

For the purposes of this document, several terms will be defined as follows. Acoustic anatomy will refer to the portion of a human body, including the upper torso, head, and pinnae, that acoustically filters sound and thus contributes to the HRTF. Anthropometric data will refer to a set of salient geometric measurements that can be used to describe a person's acoustic anatomy. Demographic data will refer to demographic information provided by a person that may include their sex, age, race, height, and weight. Generative data will refer to a combined set of complete or partial anthropometric data and demographic data that can collectively be used to estimate a person's HRTF. HRTF calculation system will refer to a function or a series of functions that takes as input any generative data and returns as output an estimated personalized HRTF.

As described in more detail herein, the general process of generating personalized HRTFs is as follows. First, an HRTF calculation system expressing the relationship between any set of generative data and a unique approximated HRTF is prepared. The system then uses an input device such as a mobile telephone containing a camera as well as a processing device such as a cloud personalization server to efficiently derive a set of generative data. The prepared HRTF calculation system is then used on the new generative data to estimate a personalized HRTF for the user.

In order to prepare the HRTF calculation system for use in the system, the following mathematical process is undertaken in a training environment. A database of mesh data, composed of high-resolution 3D scans, is made for a plurality of individuals. Demographic data for each individual are also included in the database. From the mesh data a corresponding set of target data, composed of HRTFs, is made. In one of the embodiments the HRTFs are obtained through numerical simulation of the sound field around the mesh data. For example, this simulation can be accomplished by boundary element method or finite element method. Another applicable known method for obtaining an HRTF that does not require a mesh is acoustic measurement. However, acoustic measurement requires the human subject to sit or stand stationary in an anechoic recording environment for very long periods of time in which measurements are prone to error due to human movement and microphone noise. Furthermore, acoustic measurements must be made individually for each measured source position, such that increasing the sampling resolution of the acoustic sphere can become incredibly expensive. For these reasons, the use of numerically simulated HRTFs in the training environment can be considered an improvement to HRTF database collection. In addition, anthropometric data are collected for each individual in the database and are combined with the demographic data to form a set of generative data. A machine learning process then calculates an approximated relationship, a model which will be employed as part of the HRTF calculation system, between the generative data and the target data.

Once prepared in the training environment, the HRTF calculation system may be used to generate personalized HRTFs for any user without the need for mesh data or acoustic measurement. The system queries the user for demographic data and uses a series of photogrammetry, computer vision, image processing, and neural network techniques to extract anthropometric data from structural imagery. For the purpose of this description, the term structural imagery refers to a plurality of images, which may be a series of images or be derived from "burst" images or video footage, in which the user's acoustic anatomy is visible. It may be necessary to scale the objects in the structural imagery to their true physical scale. Scaling imagery, which may be separate from or a part of the structural imagery, may be used for this purpose as described further herein. In one embodiment, a mobile device may easily be used to capture the structural imagery as well as the corresponding demographic data and any necessary scaling imagery. The resulting anthropometric data and demographic data are compiled into generative data, which are then used by the prepared HRTF calculation system to generate the personalized HRTF.

Figure 5:
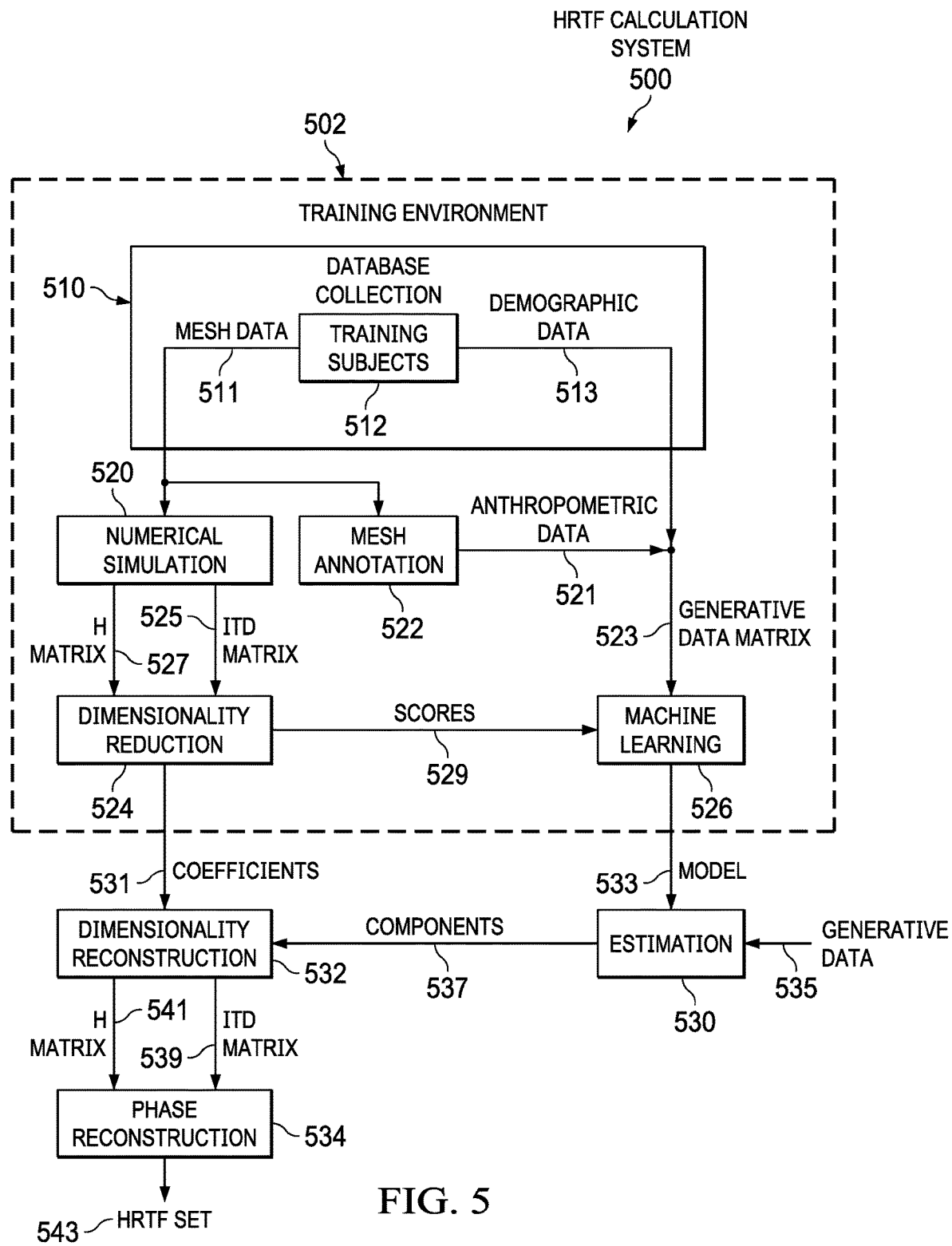
FIG. 5 is a block diagram of an HRTF calculation system 500.

FIG. 5 is a block diagram of an HRTF calculation system 500. The HRTF calculation system 500 may be implemented by the personalization server 120a (see FIG. 1), for example by executing one or more computer programs. The HRTF calculation system 500 may be implemented as a subcomponent of another component, such as the HRTF generation component 330 (see FIG. 3). The HRTF calculation system 500 includes a training environment 502, a database collection component 510, a numerical simulation component 520, a mesh annotation component 522, a dimensionality reduction component 524, a machine learning component 526, an estimation component 530, a dimensionality reconstruction component 532, and a phase reconstruction component 534.

The HRTF calculation system 500 may be prepared once as discussed below in a training environment 502, which may involve computer programs for some components as well as manual data collection for others. In general, the training environment 502 determines a relationship between the measured generative data matrix 523 of a number of subjects (low hundreds) and the values of their respective HRTFs. (This generative data matrix 523 and the HRTFs may correspond to high-resolution mesh data 511 as discussed below.) The system uses front-end generative data approximations to short-cut the need for 3D modeling, mathematical simulation, or acoustic measurement. By providing the machine learning component 526 with the "training" HRTFs and the relatively small generative data matrix 523, the system generates a model 533 that estimates the values required to synthesize an entire HRTF set 543, which the system may store and distribute in the industry standard spatially oriented format for acoustics (SOFA) format.

In the database collection component 510, demographic data 513 and 3D mesh data 511 are collected from a small number (100s) of training subjects 512. Capturing high resolution mesh scans may be a time-consuming and resource-intensive task. (This is one reason why personalized HRTFs are not more widely used, and one reason motivating easier ways to generate personalized HRTF's such as the ways described herein.) For example, a high-resolution scan may be captured using an Artec 3D scanner with 100,000 triangle mesh. This scan may require 1.5 hours of skilled post-editing labor, followed by 24 hours of distributed server time to numerically simulate the corresponding HRTF. The database collection component 510 may be unnecessary if HRTFs and generative data are obtained for use in the training environment directly from other sources, such as the Center for Image Processing and Integrated Computing (CIPIC) HRTF database from the U.C. Davis CIPIC Interface Laboratory.

At the numerical simulation component 520, in one embodiment these "training" HRTFs may be calculated using the boundary element method and may be expressed as an H matrix 527 as well as an ITD matrix 525. The H matrix 527 corresponds to a matrix of magnitude data for all of the training subjects 512 composed of frequency impulse response of the HRTFs, for any given position of a sound source. The ITD matrix 525 corresponds to a matrix of inter-aural time differences (ITDs, e.g., a left ITD and a right ITD) for all of the training subjects 512, for any given position of a sound source. The HRTF simulation technique used in one embodiment requires highly sophisticated 3D image capture and an extremely cumbersome amount of mathematical computation. For this reason, the training environment 502 is only meant to be prepared once with a finite amount of training data. The numerical simulation component 520 provides the H matrix 527 and the ITD matrix 525 to the dimensionality reduction component 524.

The mesh annotation component 522 outputs anthropometric data 521 corresponding to the anthropometric characteristics identified from the mesh data 511. For example, the mesh annotation component 522 may use manual annotation (e.g., an operator identifies the anthropometric characteristics). The mesh annotation component 522 may also use an angle and distance measurement component (see 418 in FIG. 4) to convert the annotated characteristics into measurements for the anthropometric data 521. The union of the anthropometric data 521 and the demographic data 513 is the generative data matrix 523.

In one embodiment, the dimensionality reduction component 524 may perform principal component analysis on the H matrix 527 and the ITD matrix 525 to reduce the computational complexity of the machine learning problem. For example, the H matrix 527 may have frequency response magnitudes for 240 frequencies; the dimensionality reduction component 524 may reduce these to 20 principal components. Similarly, the ITD matrix 525 may have values for 2500 source directions; the dimensionality reduction component 524 may reduce these to 10 principal components. The dimensionality reduction component 524 provides the collective principal component scores 529 of the H matrix 527 and of the ITD matrix 525 to the machine learning component 526. The coefficients 531 required to reconstruct an HRTF from the principal component space are fixed and retained for use in the dimensionality reconstruction component 532, as discussed later. Depending on the algorithm used in the machine learning component 526, other embodiments may omit the dimensionality reduction component 524.

The machine learning component 526 generally prepares the model 533 for the estimation component 530 to use in the generalized calculation of personalized HRTFs. The machine learning component 526 performs training of the model 533 to fit the generative data matrix 523 to the collective principal component scores 529 of the H matrix 527 and of the ITD matrix 525. The machine learning component 526 may use around 50 predictors from the generative data matrix 523 and may conduct known backward, forward, or best subset selection methods to determine the optimal predictors for use in the model 533.

Once the components of the training environment 502 have been executed, a generalizable relationship between generative data and HRTFs has been established. The relationship includes the model 533 and may include the coefficients 531 if dimensionality reduction is performed via the dimensionality reduction component 524. This relationship may be employed at the time of use in the production steps described below to calculate a personalized HRTF corresponding to any new set of generative data. The production steps described below may be implemented by the personalization server 120a (see FIG. 1), for example by executing one or more computer programs. The production steps described below may be implemented as a subcomponent of another component, such as the HRTF generation component 330 (see FIG. 3).

The estimation component 530 applies the model 533 to a set of generative data 535 to produce the principal components 537 of an HRTF's ITDs and magnitude spectra. The generative data 535 may correspond to a combination of the demographic data 311 and the anthropometric data 325 (see FIG. 3). The generative data 535 may correspond to the generative data 427 (see FIG. 4). The dimensionality reconstruction component 532 then uses the coefficients 531 on the components 537 to invert the dimensionality reduction process, resulting in an H matrix 541 of full magnitude spectra and an ITD matrix 539 of ITDs describing the entire acoustic sphere. The phase reconstruction component 534 then uses the H matrix 541 as well as the ITD matrix 539 to reconstruct a set of impulse responses that describe the HRTF set 543 with phase and magnitude information. In one embodiment, the phase reconstruction component 534 may implement a minimum phase reconstruction algorithm.

Finally, the machine learning system 500 uses the set of impulse responses that describe the HRTF set 543 to generate the personalized HRTF, which may be represented in SOFA format.

Further details of the HRTF calculation system 500 are as follows.

In one embodiment, the machine learning system 526 may implement linear regression to fit the model 533. For example, a set of linear regression weights may be computed to fit all of the generative data matrix 523 to each individual direction slice of the magnitude scores matrix. As another example, a set of linear regression weights may be computed to fit all of the generative data matrix 523 to the entire vector of ITD scores. The machine learning system 526 may use z-score normalization to standardize each predictor vector of the generative data matrix 523.

As a regularization method, the regression algorithm may use the least absolute shrinkage and selection operator ("lasso"). The lasso process operates to identify and ignore parameters that are irrelevant to the model at given locations (e.g., by translating those coefficients towards zero). For example, the inter-aural distance may be provided as a predictor of the generative data, yet may have very little to no effect on the magnitude of the impulse response between a user's right ear and a sound source placed directly to the user's right. Similarly, finer details of the pinna described by predictors of the generative data may have little to no effect on inter-aural time differences. By ignoring irrelevant parameters, there can be a significant reduction in overfitting and therefore an improvement in the accuracy of the model. Lasso regression may be contrasted with ridge regression in that ridge regression scales the weights, or contributions, of all predictors and does not set any coefficients to zero.

In other embodiments, the machine learning system 526 may use other methods of machine learning to generate the HRTF sets. For example, the machine learning system 526 may train a neural network to predict the entire matrix of magnitude scores. As another example, the machine learning system 526 may train a neural network to predict the entire vector of ITD scores. The machine learning system 526 may standardize the values of the HRTF via z score normalization prior to training a neural network.

In one embodiment, the training environment 502 may be optimized by only performing machine learning and/or dimensionality reduction on the transfer functions of one ear. For example, a single HRTF set containing transfer functions for the entire sphere around the head may be considered two left-ear HRTF sets, one of which is simply reflected across the sagittal plane. In this example, if the numerical simulation component 520 is conducted for 100 subjects over the entire acoustic sphere with two ears as receivers, then each subject's right-ear HRTF values may be converted to left-ear values, making a set of HRTF values containing 200 examples of left-ear HRTFs. The HRTF may be expressed as impulse responses, magnitude spectra, or inter-aural delays as a function of source position, and each right-ear position may be mapped directly to a left-ear position by reflecting its coordinates across the sagittal plane. The conversion may be performed by assigning the right-ear HRTF values to the matrix indices of the reflected positions.

Because the predictors of the generative data matrix 523 used to train the model 533 are scalar values, these predictors may also be considered independent of the side of the body on which they were measured. Thus a model 533 may be trained that only approximates, for example, left-ear HRTFs. The process of creating a user's right-ear HRTF is as simple as mapping the sphere coordinates of the HRTF set generated using the right-ear generative data back onto their original coordinates. Thus, the model 533 and the dimensionality reduction may be said to be symmetrical, even though the generative data and the resulting HRTF may not be symmetrical. Overall, this reflection process has the desirable result of reducing the complexity of the target data by a factor of two and increasing the sample size of the H matrix 527 and the ITD matrix 525 by a factor of two. A significant additional advantage to using this process is that a reflection-reconstructed HRTF may be more balanced. This is because the reflection process leads to symmetrical behavior of any noise in the HRTF calculation system 500 caused by overfitting and error in the dimensionality reduction component 524 and in the machine learning component 526.

Figure 1:
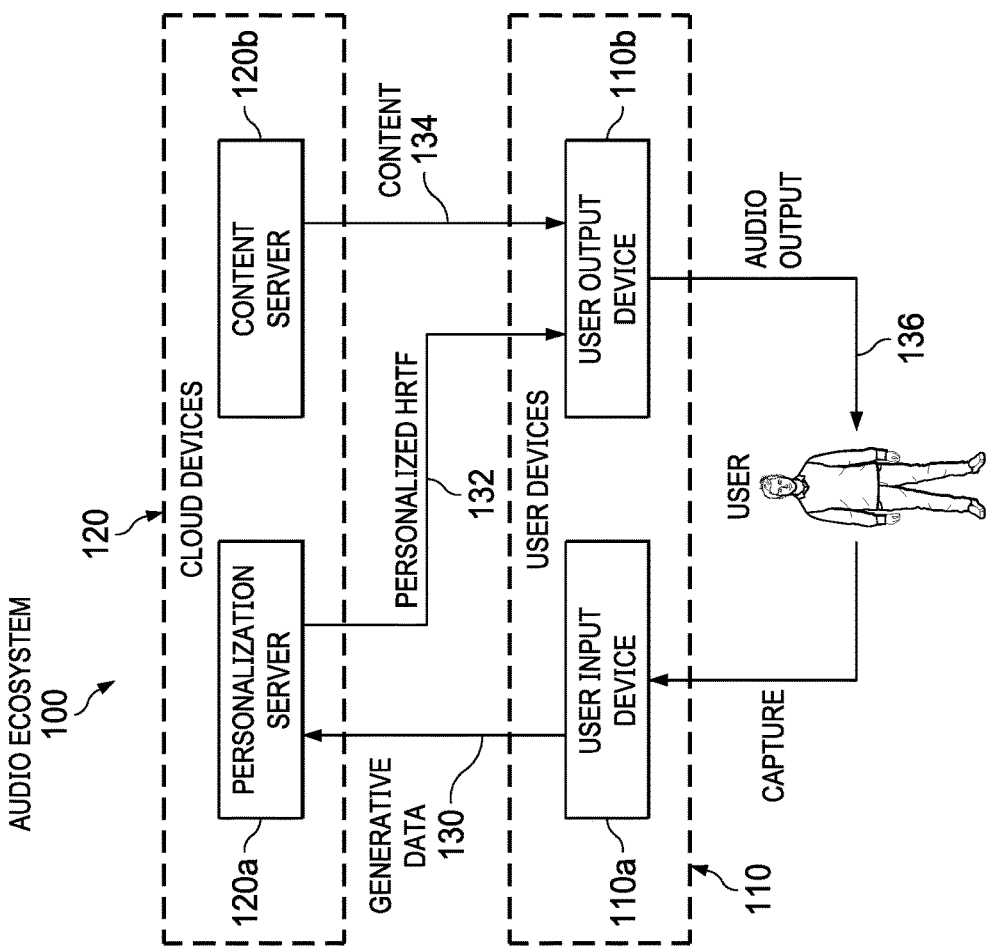
FIG. 1 is a block diagram of an audio ecosystem 100.

FIG. 1 is a block diagram of an audio ecosystem 100. The audio ecosystem 100 includes one or more user devices 110 (two shown, a user input device 110a and a user output device 110b) and one or more cloud devices 120 (two shown, a personalization server 120a and a content server 120b). Although multiple devices are shown, this is for ease of description. A single user device may implement the functions of the user input device 110a and the user output device 110b. Similarly, the functions of the personalization server 120a and the content server 120b may be implemented by a single server or by multiple computers in a distributed cloud system. The devices of the audio ecosystem 100 may be connected by a wireless or wired network (not shown). The general operation of the audio ecosystem 100 is as follows.

The user input device 110a captures generative data 130 of the user. The user input device 110a may be a mobile telephone that has a camera. The generative data 130 consist of structural imagery and/or demographic data and may also include scaling imagery. Further details of the capture process and the generative data 130 are described below.

The personalization server 120a receives the generative data 130 from the user input device 110a, processes the generative data 130 to generate a personalized HRTF 132 for the user, and stores the personalized HRTF 132. For example, the personalization server 120a may implement the estimation component 530, the dimensionality reconstruction component 532, and the phase reconstruction component 534 (see FIG. 5). Further details on generating the personalized HRTF 132 are provided below. The personalization server 120a also provides the personalized HRTF 132 to the user output device 110b.

The content server 120b provides content 134 to the user output device 110b. In general, the content 134 includes audio content. The audio content may include audio objects, for example according to the Dolby® Atmos™ system. The audio content may include multi-channel signals, for example a stereo signal converted to positionalized sound objects. The content 134 may also include video content. For example, the content server 120b may be a multimedia server that provides audio and video content, a gaming server that provides gaming content, etc. The content 134 may be provided continuously from the content server 120b, or the content server 120b may provide the content 132 to the user output device 110b for current storage and future output.

The user output device 110b receives the personalized HRTF 132 from the personalization server 120a, receives the content 134 from the content server 120b, and applies the personalized HRTF 132 to the content 134 to generate an audio output 136. Examples of the user output device 110b include a mobile telephone (and associated earbuds), headphones, a headset, earbuds, hearables, etc.

The user output device 110b may be the same device as the user input device 110a. For example, a mobile telephone with a camera may capture the generative data 130 (as the user input device 110a), may receive the personalized HRTF 132 (as the user output device 110b), and may be associated with a pair of earbuds that generate the audio output 136. The user output device 110b may be a different device than that user input device 110a. For example, a mobile telephone with a camera may capture the generative data 130 (as the user input device 110a), and a headset may receive the personalized HRTF 132 and may generate the audio output 136 (as the user output device 110b). The user output device 110b may also be associated with other devices, such as a computer, an audio/video receiver (AVR), a television, etc.

The audio ecosystem 100 is referred to as an "ecosystem" because the system adapts to whatever output device the user is currently using. For example, the user may be associated with a user identifier and the user may log in to the audio ecosystem 100. The personalization server 120a may use the user identifier to associate the personalized HRTF 132 with the user. The content server 120b may use the user identifier to manage the user's subscriptions, preferences, etc. for the content 134. The user output device 110b may use the user identifier to communicate to the personalization server 120a that the user output device 110b should receive the user's personalized HRTF 132. For example, when the user purchases a new headset (as the user output device 110b), the headset may use the user identifier to obtain the user's personalized HRTF 132 from the personalization server 120a.

FIG. 2 is a flowchart of a method 200 of generating head-related transfer functions (HRTFs). The method 200 may be performed by one or more devices of the audio ecosystem 100 (see FIG. 1), for example by executing one or more computer programs.

At 202, an HRTF calculation system is generated. In general, the HRTF calculation system corresponds to a relationship between anatomical measurements and HRTFs. The HRTF calculation system may be generated by the personalization server 120a (see FIG. 1), for example by implementing the HRTF calculation system 500 (see FIG. 5). Generating the HRTF calculation system includes substeps 204, 206, 208 and 210.

At 204, a number of 3D scans of a number of training subjects are measured. In general, the 3D scans correspond to a database of high-resolution scans of the training subjects, and the measurements correspond to the measurements of the anatomical characteristics captured in the 3D scans. The 3D scans may correspond to the mesh data 511 (see FIG. 5). The personalization server 120a may store the database of high-resolution scans.

At 206, a number of HRTFs for the training subjects are generated by performing acoustic scattering calculations on the measurements of the 3D scans. The personalization server 120a may perform in the acoustic scattering calculations to generate the HRTFs, for example by implementing the numerical simulation component 520 (see FIG. 5).

At 208, generative data of the training subjects are collected. In general, the generative data corresponds to anthropometric measurements and demographic data of the training subjects, with the anthropometric measurements determined from the 3D scan data. For example, the generative data may correspond to one or more of the demographic data 513, the anthropometric data 521, the generative data matrix 523 (see FIG. 5), etc. The anthropometric data 521 may be generated by the mesh annotation component 522 based on the mesh data 511 (see FIG. 5).

At 210, training is performed on the HRTF calculation system to transform the generative data to the plurality of HRTFs. In general, a machine learning process is performed to generate a model for use in the HRTF calculation system, by which model the generative data (see 208) are used to estimate the values of the generated HRTFs (see 206). The training may include using linear regression with Lasso regularization, as discussed in more detail below. The personalization server 120*a* may perform the training process, for example by implementing the machine learning component 526 (see FIG. 5).

At 212, a personalized HRTF is generated for a user using the HRTF calculation system. The personalization server 120*a* may generate the personalized HRTF, for example by implementing the HRTF calculation system 500 (see FIG. 5). Generating the personalized HRTF includes substeps 214 and 216.

At 214, generative data of the user are collected. In general, the generative data corresponds to anthropometric measurements and demographic data of the specific user (with the anthropometric measurements determined from 2D image data), in order to generate their personalized HRTF. For example, the generative data may correspond to the generative data 535 (see FIG. 5). A reference object may also be captured in an image with the user for scaling purposes. The user input device 110*a* (see FIG. 1) may be used to collect the generative data of the user. For example, the user input device 110*a* may be a mobile telephone that includes a camera.

At 216, the generative data of the user are input to the HRTF calculation system to obtain the personalized HRTF. The personalization server 120*a* may obtain the personalized HRTF by inputting the generative data of the user (see 214) into the results of training the HRTF calculation system (see 210), for example by implementing the estimation component 530, the dimensionality reconstruction component 532, and the phase reconstruction component 534 (see FIG. 5).

At 218, once the personalized HRTF has been generated, it may be provided to a user output device and used when generating an audio output. For example, the user output device 110*b* (see FIG. 1) may receive the personalized HRTF 132 from the personalization server 120*a*, may receive an audio signal in the content 134 from the content server 120*b*, and may generate the audio output 136 by applying the personalized HRTF 132 to the audio signal. The audio signal may include audio objects that include position information, and the audio output may correspond to a binaural audio output generated by rendering the audio objects using the personalized HRTF. For example, the audio objects may include Dolby® Atmos™ audio objects.

Further details of this process are provided below.

Figure 3:
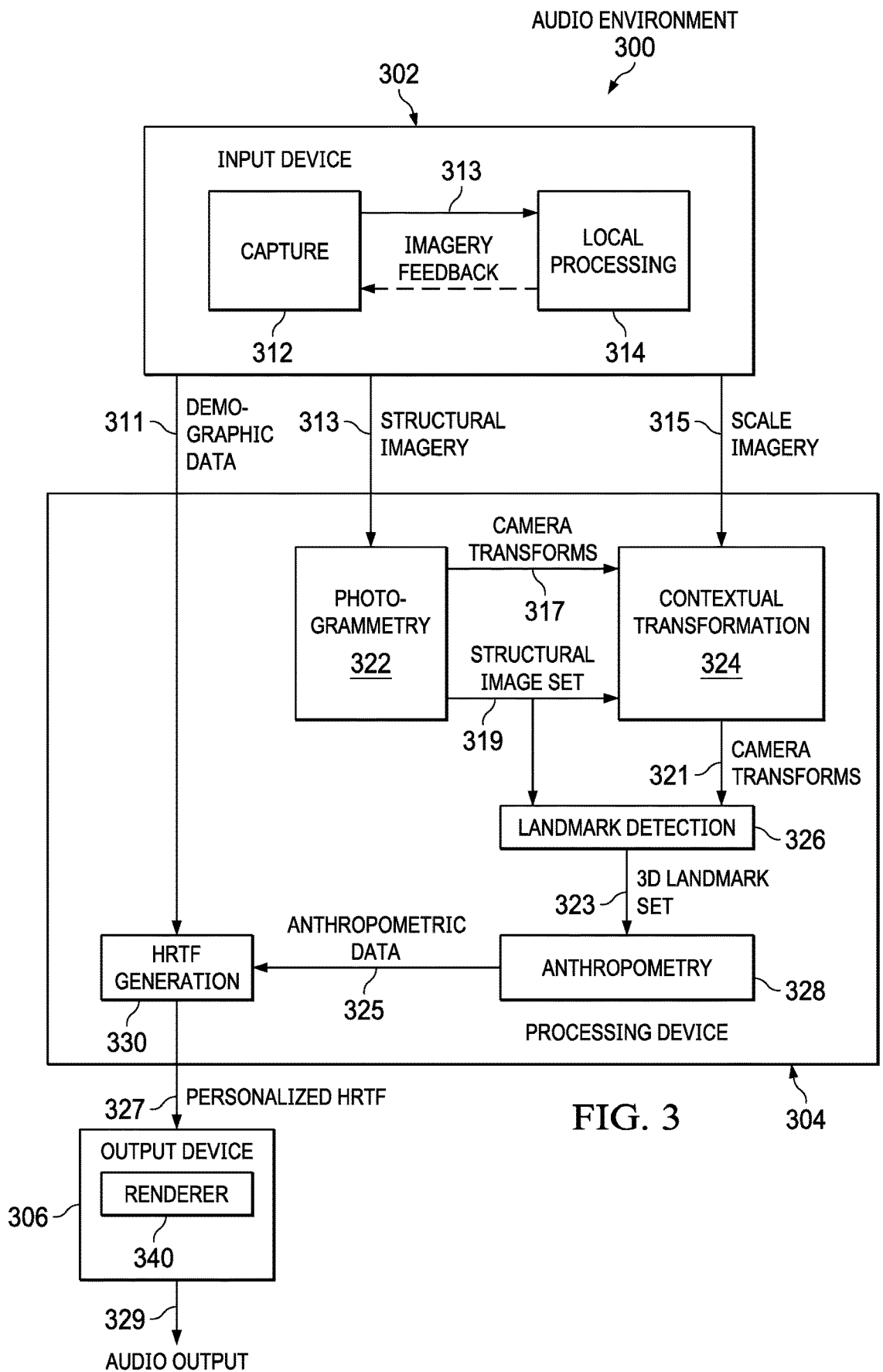
FIG. 3 is a block diagram of an audio environment 300.

FIG. 3 is a block diagram of an audio environment 300. The audio environment 300 is similar to the audio environment 100 (see FIG. 1), and provides additional details. As with the audio environment 100, the audio environment 300 may generate a personalized HRTF using one or more devices, for example by performing one or more steps of the method 200 (see FIG. 2). The audio environment 300 includes an input device 302, a processing device 304, and an output device 306. As compared to the audio environment 100, the details of the audio environment 300 are described functionally. The functions of the devices of the audio environment 300 may be implemented by one or more processors, for example that execute one or more computer programs.

The input device 302 generally captures input data of the user. (The input data is processed into generative data of the user, such as structural imagery 313, and/or demographic data 311.) The input device 302 may also capture scaling imagery 315. The input device 302 may be a mobile telephone with a camera. The input device 302 includes a capture component 312 and a feedback and local processing component 314.

The capture component 312 generally captures demographic data 311 as well as structural imagery 313 of the user's acoustic anatomy. The structural imagery 313 is then used (as further described below) to generate a set of anthropometric data 325. For ease of further processing, the structural imagery 313 capture may be performed against a static background.

One option to capture the structural imagery 313 is as follows. The user places the input device 302 on a stable surface just beneath eye level and positions themselves such that their acoustic anatomy is visible in the capture frame. The input device 302 generates a tone or other indicator, and the user slowly rotates 360 degrees. The user may rotate in a standing or sitting position, with their arms by their side.

Another option to capture the structural imagery 313 is as follows. The user holds the input device 302 at arms' length, with the user's acoustic anatomy in the video frame. Starting with the input device 302 facing the user's ear, the user sweeps their arm forward so that the video captures images from the user's ear to the front of the user's face. The user then repeats the process on the other side of their body.

Another option to capture the structural imagery 313 is as follows. As in the above embodiment, the user holds the input device 302 at arm's length, with the user's acoustic anatomy in the video frame. However, in this embodiment, the user rotates their head as far as comfortably possible to the left and right. This allows the user's head and pinnae to be captured in the structural imagery.

The above options allow the user to capture structural imagery of themselves without aid from another person. However, an additional valid embodiment would be to have a second person walk around the motionless, standing user with the camera of the input device 302 directed at the user's acoustic anatomy.

The extent, order, and manner in which the structural imagery is recorded does not matter, as long as there is structural imagery from a plurality of azimuthal, or horizontal, angles relative to face. In one embodiment, it is recommended that the structural imagery be captured at intervals of ten degrees or less and over at least the span of ninety degrees to the left and ninety degrees to the right of the user's face.

The capture component 312 may provide guidance to the user during the capture process. For example, the capture component 312 may output beeps or voice instructions to tilt the input device 302 upward or downward; to shift the input device 302 vertically to achieve perpendicularity to the user's ear; to increase or decrease the speed of the sweeping or rotating process; etc. The capture component 312 provides the structural imagery to the feedback and local processing component 314.

The feedback and local processing component 314 generally evaluates the structural imagery 313 captured by the capture component 312 and performs local processing on the capture. Regarding evaluation, the feedback and local processing component 314 may evaluate various criteria of the captured imagery, such as that the user stayed within the frame, that the user did not rotate too quickly, etc.; if the criteria indicate a failure, the feedback and local processing component 314 may return the operation of the input device 302 to the capture component 312 to perform another capture. Regarding local processing, the feedback and local processing component 314 may subtract the background from each image and perform other image processing functions such as blur/sharpness assessment, contrast assessment, and brightness assessment to ensure photographic quality. The feedback and local processing component 314 may also perform identification of key landmarks such as center of face and position of ears in the video in order to ensure that the final structural imagery 313 sufficiently describes the user's acoustic anatomy.

The captured video then includes structural imagery of the user's acoustic anatomy from a plurality of perspectives. The input device 302 then sends the final structural imagery 313, as well as any demographic data 311, to the processing device 304. The input device 302 may also send scaling imagery 315 to the processing device 304.

The processing device 304 generally processes the structural imagery 313 to produce anthropometric data 325 and to generate the personalized HRTF based on generative data composed of the anthropometric data 325 and/or demographic data 311. The processing device 304 may be hosted by a cloud-based server. Alternatively, the input device 302 may implement one or more functions of the processing device 304, in the event the cloud processing functions are desired to be implemented locally. The processing device 304 includes a photogrammetry component 322, contextual transformation component 324, a landmark detection component 326, an anthropometry component 328, and an HRTF generation component 330.

The photogrammetry component 322 receives the final version of the structural imagery 313 from the feedback and local processing component 314 and performs photogrammetry using a technique such as structure-from-motion (SfM) to generate camera transforms 317 and structural image set 319. In general, the structural image set 319 corresponds to frames of the structural imagery 313 that the photogrammetry component 322 has successfully positioned, and the camera transforms 317 correspond to three-dimensional position and orientation components for each image in the structural image set 319. The photogrammetry component 322 provides the structural image set 319 to the contextual transformation component 324 and to the landmark detection component 326. The photogrammetry component 322 also provides the camera transforms 317 to the contextual transformation component 324.

The contextual transformation component 324 uses the structural image set 319 to translate and rotate the camera transforms 317, in order to generate the camera transforms 321. The contextual transformation component 324 may also receive the scaling imagery 315 from the feedback and local processing component 314; the contextual transformation component 324 may use the scaling imagery 315 to scale the camera transforms 317 when generating the camera transforms 321.

The landmark detection component 326 receives and processes the structural image set 319 and the camera transforms 321 to generate a 3D landmark set 323. In general, the 3D landmark set 323 corresponds to anthropometric landmarks that the landmark detection component 326 has identified from the structural image set 319 and the camera transforms 321. For example, these anthropometric landmarks may include the detection of various landmarks on the visible surface of the fossa, concha, tragus, helix, etc. of each pinna. Other anthropometric landmarks of the user's acoustic anatomy detected by the landmark detection component 326 may include the eyebrow, chin, and shoulders; and measurements of the head and torso in the appropriate frames. The landmark detection component 326 provides the 3D landmark set 323 to the anthropometry component 328.

The anthropometry component 328 receives the 3D landmark set 323 and generates anthropometric data 325. In general, the anthropometric data 325 corresponds to a set of distances and angles geometrically measured between the individual landmarks of the 3D landmark set 323. The anthropometry component 328 provides the anthropometric data 325 to the HRTF generation component 330.

The HRTF generation component 330 receives the anthropometric data 325 and generates a personalized HRTF 327. The HRTF component 330 may also receive the demographic data 311 and use them when generating the personalized HRTF 327. The personalized HRTF 327 may be in spatially oriented foment for acoustics (SOFA) file format. The HRTF generation component 330 generally uses a previously-determined HRTF calculation system, as discussed in more detail herein (e.g., the model 533 trained by the HRTF calculation system 500 of FIG. 5), as part of generating the personalized HTRF 327. The HRTF generation component 330 provides the personalized HRTF 327 to the output device 306.

The output device 306 generally receives the personalized HRTF 327 from the processing device 304, applies the personalized HRTF 327 to audio data, and generates an audio output 329. The output device 306 may be a mobile telephone and associated speakers (e.g., a headset, earbuds, etc.). The output device 306 may be the same device as the input device 302. The output device 306 may implement one or more functions of the processing device 304, in the event the cloud processing functions are desired to be implemented locally. The output device 306 includes a rendering component 340.

The rendering component 340 receives the personalized HRTF 327 from the HRTF generation component 330, performs binaural rendering on audio data using the personalized HRTF 327, and generates the audio output 329.

Figure 4:
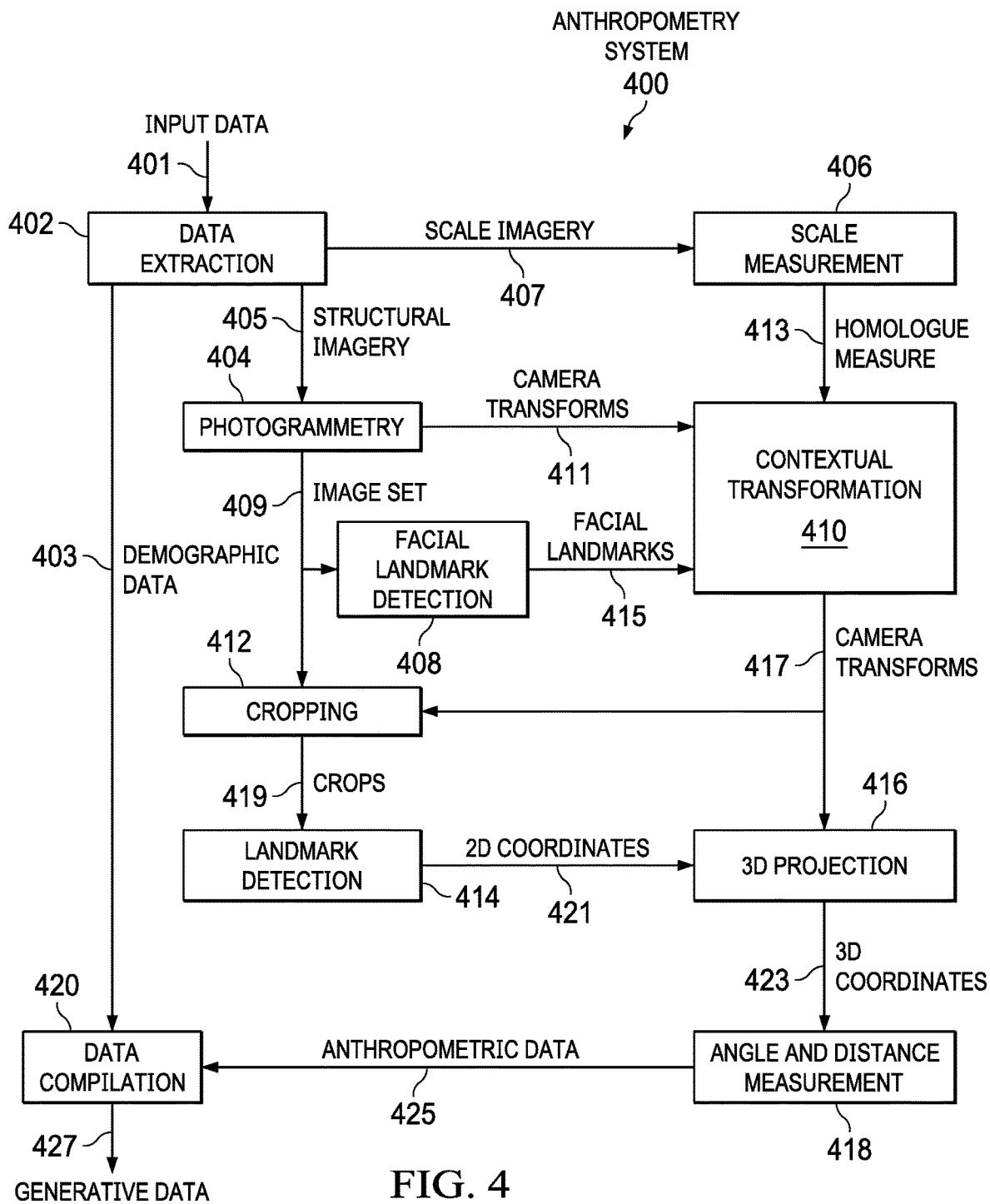
FIG. 4 is a block diagram of an anthropometry system 400.

FIG. 4 is a block diagram of an anthropometry system 400. The anthropometry system 400 may be implemented by components of the audio ecosystem 100 (e.g., the personalization server 120a of FIG. 1), the audio ecosystem 300 (e.g., the processing device 304 of FIG. 3), etc. The anthropometry system 400 may implement one or more steps of the method 200 (see FIG. 2). The anthropometry system 400 may operate similarly to one or more components of the processing device 304 (see FIG. 3), such as the photogrammetry component 322, the contextual transformation component 324, the landmark detection component 326, and the anthropometry component 328. The anthropometry system 400 includes a data extraction component 402, a photogrammetry component 404, a scale measurement component 406, a facial landmark detection component 408, a contextual transformation component 410, a cropping component 412, a landmark detection component 414, a 3D projection component 416, an angle and distance component 418, and a data compilation component 420. The functions of the components of the anthropometry system 400 may be implemented by one or more processors, for example that execute one or more computer programs.

The data extraction component 402 receives input data 401, and performs data extraction and selection to generate demographic data 403, structural imagery 405, and scale imagery 407. The input data 401 may be received from the user input device 110a (see FIG. 1) or from the input device 302 (see FIG. 3), for example including image data captured by the camera of a mobile telephone (see 214 in FIG. 2). The data extraction component provides the demographic data 403 directly to the data compilation component 420 and provides structural imagery 405 to the photogrammetry component 404 and the scale imagery 407 to the scale measurement component 406.

The photogrammetry component 404 generally performs a photogrammetric process such as structure from motion (SfM) on the structural imagery 405 to generate camera transforms 411 and an image set 409. The photogrammetric process takes the structural imagery 405 and generates a set of camera transforms 411 (e.g., the viewpoint positions and viewpoint orientations of the camera) corresponding to each frame of the image set 409, which may be a subset of the structural imagery 405. The viewpoint orientations are often expressed in either the quaternion or rotation matrix formats, but for the purpose of this document, mathematical examples will be expressed in rotation matrix format. The image set 409 is passed to the facial landmark detection component 408 and to the cropping component 412. The camera transforms 411 are passed to the contextual transformation component 410.

The photogrammetry component 404 may optionally perform image feature detection on the structural imagery 405 using a constrained image feature search prior to performing the SfM process. The constrained image feature search may improve the results of the SfM process by overcoming user error in the capture process.

The scale measurement component 406 uses the scale imagery 407 from the data extraction component 402 to generate information for later use in scaling the camera transforms 411.

The scaling information, referred to as the homologue measure 413, is generated as follows in summary. The scaling imagery includes a visible scale reference, which the scale measurement component 406 uses to measure a scale homologue that is visible in the same frame of the scaling imagery as well as in one or more frames of the structural imagery. The resulting measure of the scale homologue is passed to the contextual transformation component 410 as the homologue measure 413.

The facial landmark detection component 408 searches for visible facial landmarks in the frames of the image set 409 received from the photogrammetry component 404. The landmarks detected may include points on the user's nose as well as the location of the pupils, which may later be used as a scale homologue visible in both the image set 409 and the scale imagery 407. The resulting facial landmarks 415 are passed to the contextual transformation component 410.

The contextual transformation component 410 receives the camera transforms 411 from the photogrammetry component 404, the homologue measure 413 from the scale measurement component 406, and the set of facial landmarks 415 from the facial landmark detection component 408. The contextual transformation component 410 effectively transforms the camera transforms 411 into a set of camera transforms 417 that is appropriately centered, oriented, and scaled to the context of the acoustic anatomy captured in the structural imagery of the image set 409. In summary, the contextual transformation is accomplished by using the facial landmarks 415 and the homologue measure 413 to scale the positional information of the camera transforms 411, using the facial landmarks 415 to rotate the camera transforms 411 in 3D space, and using the facial landmarks 415 to translate the positional information of the camera transforms 411 in order to move the origin of the 3D space to the center of the user's head. The resulting camera transforms 417 are passed to the cropping component 412 and to the 3D projection component 416.

The cropping component 412 generally uses the camera transforms 417 to select and crop a subset of frames from the image set 409. Having been centered, oriented, and scaled appropriately, the cropping component 412 uses the camera transforms 417 to estimate which subset of images from the image set 409 includes structural imagery of a specific characteristic of the user's acoustic anatomy. Furthermore, the cropping component 412 may use the camera transforms 417 to estimate which portion of each image includes structural imagery of the specific characteristic. The cropping component 412 can thus be used to crop individual frames of the subset of the image set 409 to produce the resulting image data of crops 419.

The landmark detection component 414 generally provides predicted locations of specified landmarks of the user's acoustic anatomy visible in the 2D image data of the crops 419. The landmarks visible in a given image frame are thus labeled as a corresponding set of ordered 2D point locations. The cropping component 412 and the landmark detection component 414 may be coordinated to implement a constrained and recursive landmark search by cropping and detecting multiple different sets of landmarks which may be visible in different subsets of the image set 409. The landmark detection component 414 passes the resulting 2D coordinates 421 of the anatomical landmarks to the 3D projection component 416.

The 3D projection component 416 generally uses the camera transforms 417 to convert the series of 2D coordinates 421 of each anatomical landmark into a single location in 3D space. The full set of 3D landmark locations is passed as the 3D coordinates 423 to the angle and distance measurement component 418.

The angle and distance measurement component 418 uses a pre-determined set of instructions to measure the angles and distances between various points of the 3D coordinates 423. These measurements may be accomplished by applying simple Euclidean geometry. The resulting measures can effectively be used as anthropometric data 425 and are passed to the data compilation component 420.

The data compilation component 420 generally combines the demographic data 403 with the anthropometric data 425 to form a complete set of generative data 427. These generative data 427 may subsequently be used as described above in the HRTF calculation system (e.g., the generative data 535 in FIG. 5) to derive a personalized HRTF for the user.

Further details and examples of the anthropometry system 400 are as follows.

While all of the frames of the structural imagery 405 can be used in the photogrammetry component 404, the system may achieve better performance by reducing them for computational efficiency. In order to select the best frames, the data extraction component 402 may evaluate the frame content as well as sharpness metrics. An example of frame content selection might be a search for similarity in consecutive images to avoid redundancy. The sharpness metric may be selected from a number of sharpness metrics, with an example being the use of a 2D spatial frequency power spectra radially collapsed into a 1D power spectra. The data extraction component 402 provides the selected set of structural imagery 405 to the photogrammetry component 404. Because the photogrammetry component 404 may implement a time-intensive process, the data extraction component 402 may pass the structural imagery 405 before collecting the scaling imagery 407 or the demographic data 403 from the input data 401. If the system is capable of parallel processing, this order of operations may be an example of desirable optimization.

The SfM process inputs a series of frames (e.g., the structural imagery 405, which do not need to be sequentially ordered), and outputs an estimate of the assumed rigid object imaged in the capture process (a 3D point cloud) as well as calculated viewpoint positions (x,y,z) and rotation matrices for each frame input. These viewpoint positions and rotation matrices are referred to in this document as camera transforms (e.g., the camera transforms 411), because they describe where each camera is located and oriented with respect to the world space, which is a common term for the 3D coordinate system that contains all the camera viewpoints and the structural imagery. Note that for this application, the 3D point cloud itself need not be further used; that is, it is not necessary to generate a 3D mesh object for any part of the user's anthropometric measurement determinations. It is not uncommon for the SfM process to fail to derive camera transforms for one or more of the images in the optimal set of structural imagery 405. For this reason, any failed frames may be omitted from subsequent processing. Because autofocusing camera applications are not necessarily optimized for the capture conditions of this system, it may be useful for the image capture component (see FIG. 3) to fix the camera focal length during the image capture process.

The SfM process considers the pinnae and head to be essentially rigid objects. In determining the shape and position of these objects, the SfM process first implements one or more known image feature detection algorithms, such as SIFT (shift-invariant feature transform), a HA (Hessian Affine feature point detector), or HOG (histogram of oriented gradients). The resulting image features differ from the facial and anatomical landmarks in that they are not individually pre-trained and are not specific to the context of acoustic anatomy in any way. Because other parts of the user's body may not remain rigid throughout the capture process, it may be useful to program the photogrammetric process to infer geometry using only the image features detected in the area of the head. This selection of image features can be accomplished by executing the facial landmark detection component 408 prior to executing the photogrammetry component 404. For example, known techniques of face detection can be used to estimate the landmarks defined by the bounding box of the head or face in each image. The photogrammetry component 404 may then apply a mask to each image to include only the image features detected by computer vision inside the corresponding bounding box. In another embodiment, the facial landmarks may be directly used by the photogrammetry component 404 in lieu of or in addition to the detected image features. By restricting the scope of image features used in the photogrammetric process, the system may also be made more efficient and optimized. If the facial landmark detection component 408 is executed prior to the photogrammetry component 404, then the facial landmark detection component 408 may receive the structural imagery 405 directly from the data extraction component 402 in lieu of the image set 409 and may pass the facial landmarks 415 to both the photogrammetry component 404 and to the contextual transformation component 410.

The photogrammetry component 404 may also include a focal length compensation component. The focal length of the camera can either exaggerate the depth of the ear shapes (e.g., due to barrel distortion from a short focal length) or diminish such depths (e.g., due to pincushion distortion from long focal lengths). In many smartphone cameras, such focal length distortions are often of the barrel distortion type, which the focal length compensation component may detect according to the focal length and the distance to the captured images. This focal length compensation process may be applied using known methods to undistort the image set 409. This compensation may be particularly useful when processing structural imagery from the handheld capture method.

A more detailed description of the scale measurement component 406 is as follows. The term scale reference refers to an imaged object of known size, such as a banknote or an identification card. The term scale homologue refers to an imaged object or distance that is common to two or more images and that may be used to infer the relative size or scale of objects in each image. This scale homologue is in turn shared with the structural imagery, and can therefore be used to scale the structural imagery and any measurements made therein. A variety of scale homologues and scale references may be used, with the embodiment described below as an example.

The following is an example embodiment of the scale measurement component 406. The user may capture an image of the user holding a card having a known size (e.g., 85.60 mm by 53.98 mm) at their face (e.g., in front of their mouth, and perpendicular to the front of their face). This image may be captured in a manner similar to the capture of the structural imagery 405 (such as before or after the capture of the structural imagery 405, so that the card does not otherwise obstruct the capture process), and may be captured from a position perpendicular to the front of their face. The card may then be used as a scale reference to measure the physical interpupillary distance in millimeters between the user's pupils, which may later be used by the contextual transformation component 410 as a scale homologue in order to apply absolute scale to the structural imagery. This is possible because the structural imagery capture includes one or more images in which the user's pupils are visible. The scale measurement component 406 may implement one or more neural networks to detect and measure the scale reference and the scale homologue, and may apply computer vision processes to refine the measurement.

In one embodiment, the face detection algorithms used in the facial landmark detection component 408 may also be used to locate the pixel coordinates of the user's pupils in the scale imagery. The scale measurement component 406 may also use a pre-trained neural network and/or computer vision techniques to define the borders and/or landmarks of the scale reference. In this example embodiment, the scale measurement component 406 may use a pre-trained neural network to estimate the corners of the card. Next, coarse lines may be fit to each pair of points describing the corners of the card detected by the neural network. The pixel distances between these coarse lines may be divided by the known dimensions of the scale reference in millimeters to derive the pixels per millimeter of the image at the distance of the card.

For the sake of accuracy, the scale measurement component 406 may perform the following computer vision technique to fine tune the measurement of the card. First, a canny edge detection algorithm may be applied to a normalized version of the scale imagery. Then a Hough transform may be used to infer the fine lines in the scale imagery. The area between each coarse line and each fine line may be calculated. Then, a threshold number (e.g. 10 pixels times the dimensions of the image) may be used to select only those fine lines that are separated from the coarse neural network prediction by a small area. Finally, the median of the selected fine lines may be chosen as the final border of the card and used as described above to derive the pixels per millimeter of the image. Because the card and the user's pupils are at a similar distance from the camera, the distance between the user's pupils in pixels may be divided by the pixels per millimeter calculation in order to measure the user's interpupillary distance in real millimeters. The scale measurement component 406 thus passes this interpupillary distance as the homologue measure 413 to the contextual transformation component 410.

The above embodiment of a scaling technique has been observed to be relatively accurate as well as accessible on a wide range of input devices containing a standard camera. The following embodiments are presented as alternatives in the event that additional sensors are available to the input device and may be used to infer scale information without the need for a scale reference.

A second process for measuring a scale homologue is a multimodal approach taking advantage of not only a camera but also a microphone and a speaker (e.g., a pair of earbuds), which may all be components of the capture device (e.g., the user input device 110*a* of FIG. 1 such as a mobile telephone). Because sound is known to travel reliably at 343 m/s, a signal sound played on an earbud next to the user's face can be expected to be recorded on the phone with precisely the amount of delay that is required for the sound to travel to the phone's microphone. In turn, this delay can be multiplied by the speed of sound to find the distance from phone to face. An image of the face may be taken at the same time the sound is fired, and this image will contain scale homologues, such as the user's eyes. The scale measurement component may use some simple trigonometry to calculate the distance between the user's pupils or another pair of reference points in metric units:

$$d = delay * sos$$

$$w\_mm = 2 * \tan(aov/2) * d$$

$$ipd\_mm = w\_mm * ipd\_pix / w\_pix$$

(In the above equations, ipd_pix is the pixel distance between the user's pupils, ipd_mm is the millimeter distance between the user's pupils, sos is the speed of sound in millimeters per millisecond, delay is the delay between playback and recording of the signal sound in milliseconds, w_mm is the horizontal dimension of the imaged plane at distance d in millimeters, w_pix is the horizontal dimension of the image in pixels, and aov is the horizontal angle of view of the imaging camera.)

Wireless earbuds and conceivably even over-the-ear headphones may also be used and simply turned on to begin the process. The volume of the recorded signal may be used as an indication of proximity between the earbud and the microphone. The earbud may be placed generally in proximity to the scale homologue. The sound signals may be within, below or above the threshold of human hearing, such as chirps, frequency sweeps, and dolphin calls or other such engaging and pleasing sounds. The sounds may be extremely short (e.g., less than one second), allowing for many measurements to be made (e.g., over the course of many seconds) for purposes of redundancy, averaging, and statistical analysis.

Another option for establishing the scale of the structural imagery, which may be used in the alternative capture process of physically sweeping the camera around the head, is to use inertial measurement unit (IMU) data from the user input device (e.g., 110*a* in FIG. 1) to establish absolute distances between camera positions (e.g., accelerometers, gyroscopes, etc. with acceptable tolerances).

Another option for establishing the scale of the structural imagery, which may be used in any of the capture process embodiments, is to use image range imaging, which may be made available by the input device in a variety of forms. For example, some input devices, such as modern mobile telephones, are equipped with range cameras that take advantage of technologies such as structured light, split pixels, or interferometry. An estimate may be derived via known methods for the depth of a given pixel when any of these technologies is used in combination with the standard camera. The distance between the scale homologue and the camera may therefore be directly estimated using these technologies, and the subsequent processes for measuring the scale homologue may be implemented as described above.

The facial landmark detection component 408 may perform face detection as follows. The facial landmark detection component 408 may extract landmarks from clear frames of the image set 409 using histograms of oriented gradients. As an example, the facial landmark detection component 408 may implement the process described by Navneet Dalal and Bill Triggs, Histograms of Oriented Gradients for Human Detection, International Conference on Computer Vision & Pattern Recognition (CVPR '05), June 2005, San Diego, United States, pp. 886-893. The facial landmark detection component 408 may implement a support vector machine (SVM) with a sliding window approach for classification of the extracted landmarks. The facial landmark detection component 408 may use non-max suppression to reject multiple detections. The facial landmark detection component 408 may use a model that has been pre-trained on a number of faces (e.g., 3000 faces).

The facial landmark detection component 408 may perform 2D coordinate detection using an ensemble of regression trees. As an example, the facial landmark detection component 408 may implement the process described by Vahid Kazemi and Josephine Sullivan, One Millisecond Face Alignment with an Ensemble of Regression Trees, The IEEE Conference on Computer Vision and Pattern Recognition (CVPR), 2014, pp. 1867-1874. The facial landmark detection component 408 may identify a number of facial landmarks (e.g., five landmarks, such as the inner and outer edges of each eye and the columella of the nose). The facial landmark detection component 408 may identify the facial landmarks using a model that has been pre-trained on a number of faces (e.g., 7198 faces). The landmarks may include a number of points corresponding to various facial characteristics, such as the points defining the bounding box or border of the face (outside of cheeks, chin, etc.), the eyebrows, the pupils, the nose (bridge, nostrils, etc.), the mouth, etc.

In another embodiment, a convolutional neural network may be used for 2D facial landmark detection. The facial landmark detection component 408 may identify a number of facial landmarks (e.g., 5 or more) using a neural network model that has been trained on a database of annotated faces. The landmarks may include the 2D coordinates of various facial landmarks.

The contextual transformation component 410 uses a series of coordinate and orientation transformations to normalize the camera transforms 411 with respect to the user's head. The context of the transformations is analogous to the positioning and orientation of a human head as measured or calculated in the production of an HRTF. For example, in one embodiment, the HRTFs used in the target data (see the training environment 502 in FIG. 5) are calculated or measured with the x-axis running between the user's ear canals and with the y-axis running through the user's nose.

The contextual transformation component 410 first uses a least squares algorithm to find the plane of best fit to the positional data of the camera transforms 411. The contextual transformation component 410 may then rotate the plane of best fit (along with the camera transforms 411) onto the x-y plane (such that the z axis is accurately described as "up" and "down").

In order to complete absolute scaling and other following transformations, the contextual transformation component 410 may estimate the locations of several key landmarks of the facial landmarks 415, which may include the pupils and nose, in the world space. The system may use a process similar to the 3D projection component 416, which will be detailed below, to position these landmarks using the full set of 2D facial landmarks 415. Once the 3D locations of the facial landmarks are determined, the following transformations may be made.

First, the origin of the world space may be centered by subtracting the arithmetic mean of the 3D coordinates of the eyes from the positional information of the camera transforms 411 and from the 3D locations of the facial landmarks 415. Next, in order to apply absolute scale to the world space, the contextual transformation component 410 may multiply the positional information in the camera transforms 411 and the 3D locations of the facial landmarks 415 by a scaling ratio. This scaling ratio may be derived by dividing the homologue measure 413 by the estimate of the inter-pupillary distance calculated using the 3D locations of the left and right sides of each eye, or those of the pupils themselves. This scaling process allows the HRTF synthesis system 400 to use real-world (physical) distances, since the physical distances relate specifically to sound waves and their subsequent reflection, diffraction, absorbance, and resonant behavior.

At this point, the scaled, centered camera transforms need to be oriented about the vertical axis of the world space, which may be referred to as the z-axis. In the photography field, a photograph in which the subject's face and nose are pointed directly towards the camera is commonly referred to as a full-face photograph. It may be useful to rotate the camera transforms 411 about the z-axis of the world space such that the full-face frame of the image set 409 corresponds to a camera transform that is positioned at zero degrees relative to one of the other two axes, for example the y-axis, of the world space. The contextual transformation component 410 may implement the following process to identify the full-face frame of the image set 409. The contextual transformation component 410 minimizes the point asymmetry of the facial landmarks 415 to find the "full face" reference frame. For example, the full-face frame may be defined as the frame in which each pair of pupils is closest to equidistant from the nose. In mathematical terms, the contextual transformation component 410 may calculate the asymmetry according to an asymmetry function $|L-R|/F$, where L is the centroid of the landmarks on the left side, R is the centroid of the landmarks on the right side, and F is the centroid of all the facial landmarks 415. The full-face frame is then the one where the asymmetry is minimized. Once the full-face frame is chosen, the camera transforms 411 and the 3D locations of the facial landmarks 415 may be rotated about the z-axis such that the full-face frame of the image set 409 corresponds to a camera transform that is positioned at zero degrees relative to the y-axis of the world space.

Finally, the contextual transformation component 410 may translate the camera transforms 411 into the head such that the origin of the world space corresponds not to the center of the face, but rather to the estimated point between the ears. This can be done simply by translating the camera transforms along the y-axis by an average value of the orthogonal distance between the face and the interaural axis. This value may be calculated using the human anthropometric data in the mesh database (see the mesh data 511 in FIG. 5). For instance, the authors have found that the average orthogonal distance between the eyebrow and the ears of that data set is 106.3 millimeters. In one embodiment, in order to account for the angular pitch of the head, the camera transforms may also be rotated about the interaural axis, the axis between the ear canals. This rotation may be done such that the 3D location of the nose lies along the y-axis.

As a result of the above processes, the contextual transformation component 410 generates centered, leveled, and scaled, camera transforms 417. These camera transforms 417 may be used by the cropping component 412 to estimate the images in which various points describing the user's acoustic anatomy are visible. For example, the images for which the camera transforms 417 are positioned between 30 degrees and 100 degrees clockwise about the z-axis of the world space are likely to contain structural imagery of the user's right ear, given that the tip of the user's nose is aligned with the y-axis of the world space at 0 degrees. Once these images are selected from the image set 409, they may be cropped to include only the portion of the image that is estimated to contain the structural imagery of the landmark or landmarks of interest.

In order to crop each image to the appropriate portion, the cropping component 412 may calculate the approximate location and size of the 3D point cloud containing the anatomical landmarks of interest. For example, the average distance between the ear canals is around 160 millimeters, and the camera transforms 411 have been centered about the estimated bisection of this line. Thus, the location of the point cloud of each ear may be expected to lie approximately 80 millimeters in either direction along the x-axis of the world space, given that the tip of the user's nose is aligned with the y-axis of the world space. In this example, the size of each 3D point cloud is likely to be around 65 millimeters in diameter, which describes the average length of the ear.

The cropping may now be accomplished using the following technique. The orientation information of each camera's transform describes how the three axes of the camera are linearly related to the three axes of the world space, and the camera's principal axis is conventionally considered to describe the vector passing from the camera's position through the center of the image frame. Consider the landmark line to be the line in the world space between the camera's position and the landmark point cloud's estimated position. The camera transform's rotation matrix may be used directly to express the landmark line in the camera space, or the particular camera's 3D coordinate system. The camera's angle of view is an intrinsic parameter that can be computed using the 35-millimeter equivalent focal length or the focal length and sensor size of the camera, both of which can either be derived from a camera lookup table, from EXIF data encoded with each image, or from the input device itself at the time of capture. The landmark line may be projected onto the image using the angle of view of the camera and the pixel dimensions of the image. For example, the horizontal pixel distance between the center of image and the landmark in the image plane ("x") may be approximated as follows:

$$d\_pix = (w\_pix/2)/\tan(aov/2)$$

$$x\_pix = d\_pix * \tan(fax/2)$$

(In the above equations, d_pix is the distance in pixels between the camera and the image plane, w_pix is the horizontal dimension of the image in pixels, aov is the horizontal angle of view of the imaging camera, and fax is the horizontal angular component of the landmark line.)

Once the pixel location of the center of the landmark point cloud has been approximated, the appropriate width and height of the crop may be computed using similar methods. For example, since almost all ears are under 100-millimeters along their longest diagonal, a 100-millimeter crop is reasonable for locating landmarks of the ear. As described in the step below, many neural networks use square images as input, meaning that the final cropped image has the same height and width. For this ear example, a crop of +/−50 millimeters vertically and horizontally from the landmark center may therefore be appropriate. The distance from the camera to the image plane in world space units may be computed by calculating the magnitude of the orthogonal projection of the landmark line onto the camera's principal axis in the world space. Since this distance has been computed above in pixels, the pixels per millimeter ratio may be computed and applied to the 50-millimeter cropping dimensions to determine the bounds of the crop in pixels. Once the cropping component 412 has completed this cropping process, the image may be rescaled and used in the landmark detection component 414 as described below.

In order to identify the 2D coordinates 421, the landmark detection component 414 may use a neural network. For example, the personalization server 120a (see FIG. 1) or the user input device 110a (see FIG. 1) may use a neural network as part of implementing the neural network component 326 (see FIG. 3), the face detection component (see 410 in FIG. 4), or the facial landmark detection component (see 408 in FIG. 4), etc. According to one embodiment, the system implements a convolutional neural network (CNN) that performs labeling of anatomical landmarks. The system may implement the CNN by running the Keras neural-network library (written in Python) on top of the TensorFlow machine learning software library, using a MobileNets architecture that has been pre-trained on an ImageNet database. The MobileNets architecture may use an alpha multiplier of 0.25 and a resolution multiplier of 1, and may be trained on a database of structural imagery to detect facial landmarks for constructing anthropometry data 425.

For example, an image (e.g., one of structural imagery frames 313) may be downsampled to a smaller resolution image and may be represented as a tensor (a multidimensional data array) having size 224×224×3. An image may be processed by a MobileNets architecture trained to detect a given set of landmarks, resulting in a tensor having size 1×(2*n) that identifies the x and y coordinates of the n landmarks. For example, this process may be used to produce x and y coordinates for 18 ear landmarks and 9 torso landmarks. In a different embodiment, the Inception V3 architecture, or a different convolutional neural network architecture, may be used. The cropping component 412 and the landmark detection component 414 may be used repeatedly or simultaneously for different images and/or different sets of landmarks.

In order to estimate a singular value for the coordinates of each landmark, the 2D coordinates 421 from the landmark detection component 414 are passed along with the camera transforms 417 to the 3D projection component 416. The 3D projection component 416 may project the 2D coordinates 421 from each camera into the world space and then perform a least squares calculation to approximate the intersection of the set of projected rays for each landmark. For example, the description of the cropping component 412 above details how a landmark line in the world space may be projected into the image plane via a series of known photogrammetric methods. This process is invertible, such that each landmark in the image plane may be represented as a landmark line in the world space. There are several known methods for the estimating intersection of multiple lines in 3D space, such as a least squares solution. At the conclusion of the 3D projection component 416, a plurality of landmark locations, which may be collected from different perspective ranges and/or by using different neural networks, has been computed in the world space. This set of 3D coordinates 423 may also include 3D coordinates computed via other methods, such as the computation above of the location of each pupil.

In one embodiment, it may be useful to repeat the processing of the contextual transformation component 410, the cropping component 412, the landmark detection component 414, and the 3D projection component 416 in order as part of an iterative refinement process. For example, the initial iteration of the contextual transformation component 410 may be considered a "coarse" positioning and orientation of the camera transforms 417, and the initial iteration of the cropping component 412 may be considered a "coarse" selection and cropping from the image set 409. The 3D coordinates 423 may include an estimated location of each ear, which may be used to repeat the contextual transformation component 410 in a "fine" iteration. In the preferred embodiment, the "coarse" crop may be significantly larger than the estimated size of the landmark point cloud to allow for error in the landmark line estimation. As part of the refinement process, the cropping component 412 may be repeated with a tighter, smaller crop of the image after the fine iteration of the contextual transformation component 410. This refinement process may be repeated as many times as desired, but in one embodiment, at least one refinement iteration is recommended. This is recommended because the accuracy of the landmark detection component 414 has been found by the authors to be greater when the cropping component 412 uses a tighter crop; however, the crop must include structural imagery of the entire landmark set and therefore must in turn be set using accurate estimates of the landmark line.

The actual anthropometric data that the system uses to generate the personalized HRTF are scalar values that represent the lengths of anatomical characteristics and the angles between anatomical characteristics. These calculations across subsets of the 3D coordinates 423 are prescribed and executed by the angle and distance measurement component 418. For example, the angle and distance measurement component 418 may prescribe a calculation of a "shoulder width" as the Euclidean distance between the "left shoulder" coordinates and the "right shoulder" coordinates belonging to the set of 3D coordinates 423. As another example, the angle and distance measurement component 418 may prescribe a calculation of a "pinna flare angle" as the angular representation of the horizontal component of the vector between the "concha front" coordinates and the "superior helix" coordinates. Known sets of anthropometric measures for use in HRTF calculation have been proposed and may be collected during this process. For example, anthropometry determined from the 3D coordinates 423 may include, for each pinna of the user, a pinna flare angle, a pinna rotation angle, a pinna cleft angle, a pinna offset back, a pinna offset down, a pinna height, a first pinna width, a second pinna width, a first intertragic width, a second intertragic width, a fossa height, a concha width, a concha height, and a cymba concha height. At this point, the data compilation component 420 may assemble the resulting anthropometric data 425 and the previously mentioned demographic data 403 to form generative data 427 needed to generate a personalized HRTF.

The data compilation component 420 may perform what is referred to as graceful degradation when compiling the generative data 427. Graceful degradation may be used when one or more predictors of the demographic data 403 is not provided or when the identification of one or more predictors of the generative data 427 fails or is inconclusive. In such a case, the data compilation component 420 may generate an estimate of the missing predictor based on other known predictors of the generative data 427, and may then use the estimated predictor as part of generating the personalized HRTF. For example, if the system is unable to determine a measurement for the shoulder width, the system may use demographic data (e.g., age, sex, weight, height, etc.) to generate an estimate for the shoulder width. As another example, the data compilation component 420 may use calculations of some pinna characteristics that were made with high confidence metrics (e.g. low error in the least squares solution) to estimate the values of other pinna characteristics that were calculated with less confidence. The estimation of subsets of the generative data 427 using other subsets may be accomplished using predetermined relationships. For example, as part of the training environment (see 502 in FIG. 5), the system may use anthropometric data from the training database of high-resolution mesh data to perform linear regression between various sets of generative data. As another example, the publicly published Anthropometric Survey of US Army Personnel (ANSUR 2 or ANSUR II) includes certain characteristics that may be included as predictors in the generative data and may be used in the linear regression method described above. In summary, the data compilation component 420 avoids the issue of missing data by estimating any missing values from the available information in the demographic data 403 and the anthropometric data 425. The use of complete sets of generative data 427 in turn avoids the need to account for missing data in the HRTF calculation system.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method, comprising:
generating an HRTF calculation system taking anthropometric measurements and, optionally, demographic data of a user as input and returning a personalized HRTF for the user as output,
obtaining 3D scans of a plurality of training subjects,
generating HRTFs for the plurality of training subjects by performing acoustic scattering calculations on anatomical characteristics captured in the 3D scans,
collecting anthropometric measurements and, optionally, demographic data of the plurality of training subjects, and
training the HRTF calculation system to transform the anthropometric measurements and, optionally, demographic data of the plurality of training subjects to the HRTFs.

2. The method of claim 1, wherein performing acoustic scattering calculations on anatomical characteristics captured in a 3D scan comprises performing a numerical simulation of the sound field around a mesh corresponding to the 3D scan.

3. The method of claim 1, wherein the anthropometric measurements of the plurality of training subjects are determined from the 3D scans.

4. The method of claim 1, wherein the training is performed using linear regression with Lasso regularization.

5. The method of claim 1, further comprising:
collecting a plurality of images of a user;
using the plurality of images of the user to determine anthropometric measurements of the user, and
inputting the anthropometric measurements of the user to the HRTF calculation system to obtain a personalized HRTF for the user.

6. The method of claim 5, wherein the anthropometric measurements of the user are determined using a convolutional neural network.

7. The method of claim 1, further comprising:
generating an audio output by applying the personalized HRTF to an audio signal.

8. The method of claim 1, further comprising:
storing, by a server device, the personalized HRTF; and
transmitting, by the server device, the personalized HRTF to a user device,
wherein the user device generates an audio output by applying the personalized HRTF to an audio signal.

9. The method of claim 1, wherein an audio signal comprises a plurality of audio objects that includes position information, the method further comprising:
generating a binaural audio output by applying the personalized HRTF to the plurality of audio objects.

10. The method of claim 1, the method further comprising:
executing, by a server device that is configured to generate the personalized HRTF for the user using the HRTF calculation system, a photogrammetry component, a contextual transformation component, a landmark detection component, and an anthropometry component,
wherein the photogrammetry component receives a plurality of structural imagery of the user, and generates a plurality of camera transforms and a structural image set using a structure-from-motion technique,
wherein the contextual transformation component receives the plurality of camera transforms and the structural image set, and generates a transformed plurality of camera transforms by translating and rotating the plurality of camera transforms using the structural image set,
wherein the landmark detection component receives the structural image set and the transformed plurality of camera transforms, and generates a 3D landmark set that corresponds to anthropometric characteristics of the user identified using the structural image set and the transformed plurality of camera transforms,
wherein the anthropometry component receives the 3D landmark set, and generates anthropometric data from the 3D landmark set, wherein the anthropometric data corresponds to a set of distances and angles measured between individual landmarks of the 3D landmark set, and
wherein the server device generates the personalized HRTF for the user by inputting the anthropometric data into the HRTF calculation system.

11. The method of claim 1, the method further comprising:
executing, by the server device that is configured to generate the personalized HRTF for the user using the HRTF calculation system, a landmark detection component, a 3D projection component, and an angle and distance measurement component,
wherein the landmark detection component receives a cropped image set of anthropometric landmarks of the user, and generates a set of 2D coordinates of the set of anthropometric landmarks of the user from the cropped image set,
wherein the 3D projection component receives the set of 2D coordinates and a plurality of camera transforms, and generates a set of 3D coordinates that correspond to the set of 2D coordinates of each of the anthropometric landmarks in 3D space using the camera transforms,
wherein the angle and distance measurement component receives the set of 3D coordinates, and generates anthropometric data from the set of 3D coordinates, wherein the anthropometric data correspond to angles and distances of the anthropometric landmarks in the set of 3D coordinates,
wherein the server device generates the personalized HRTF for the user by inputting the anthropometric data into the HRTF calculation system.

12. A non-transitory computer readable medium storing a computer program that, when executed by a processor, controls an apparatus to execute processing including the method of claim 1.

13. An apparatus for generating head-related transfer functions (HRTFs), the apparatus comprising:
at least one processor; and
at least one memory,
wherein the at least one processor is configured to control the apparatus to:
generate an HRTF calculation system taking anthropometric measurements and, optionally, demographic data of a user as input and returning a personalized HRTF for the user as output,
obtain 3D scans of a plurality of training subjects,
generate HRTFs for the plurality of training subjects by performing acoustic scattering calculations on anatomical characteristics captured in the 3D scans,
collect anthropometric measurements and, optionally, demographic data of the plurality of training subjects, and
train the HRTF calculation system to transform the anthropometric measurements and, optionally, demographic data of the plurality of training subjects to the HRTFs.

14. The apparatus of claim 13, wherein the at least one processor is further configured to control the apparatus to perform acoustic scattering calculations on anatomical characteristics captured in a 3D scan by performing a numerical simulation of the sound field around a mesh corresponding to the 3D scan.

15. The apparatus of claim 13, wherein the at least one processor is further configured to control the apparatus to determine the anthropometric measurements of the plurality of training subjects from the 3D scans.

16. The apparatus of claim 13, the apparatus further comprising:
a user input device that is configured to collect a plurality of images of a user, wherein the at least one processor is further configured to use a plurality of images of a user captured by the user input device to determine anthropometric measurements of the user, and to input the anthropometric measurements of the user to the HRTF calculation system to obtain a personalized HRTF for the user.

17. The apparatus of claim 13, further comprising:
a user output device that is configured to generate an audio output by applying the personalized HRTF to an audio signal.

18. The apparatus of claim 13, further comprising:
a server device that is configured to generate the HRTF calculation system, to generate the personalized HRTF, to store the personalized HRTF, and to transmit the personalized HRTF to a user device,
wherein the user device is configured to generate an audio output by applying the personalized HRTF to an audio signal.

19. The apparatus of claim 13, further comprising:
a server device that is configured to generate the personalized HRTF for the user using the HRTF calculation system, wherein the server device executes a photogrammetry component, a contextual transformation component, a landmark detection component, and an anthropometry component,
wherein the photogrammetry component is configured to receive a plurality of structural imagery of the user, and to generate a plurality of camera transforms and a structural image set using a structure-from-motion technique,
wherein the contextual transformation component is configured to receive the plurality of camera transforms and the structural image set, and to generate a transformed plurality of camera transforms by translating and rotating the plurality of camera transforms using the structural image set,
wherein the landmark detection component is configured to receive the structural image set and the transformed plurality of camera transforms, and to generate a 3D landmark set that corresponds to anthropometric characteristics of the user identified using the structural image set and the transformed plurality of camera transforms,
wherein the anthropometry component is configured to receive the 3D landmark set, and to generate anthropometric data from the 3D landmark set, wherein the anthropometric data corresponds to a set of distances and angles measured between individual landmarks of the 3D landmark set, and
wherein the server device is configured to generate the personalized HRTF for the user by inputting the anthropometric data into the HRTF calculation system.

20. The apparatus of claim 13, further comprising:
a server device that is configured to generate the personalized HRTF for the user using the HRTF calculation system, wherein the server device executes a scale measurement component,
wherein the scale measurement component is configured to receive scale imagery that includes an image of a scale reference, and to generate a homologue measure,
wherein the server device is configured to scale structural imagery of the user using the homologue measure.

21. The apparatus of claim 13, further comprising:
a server device that is configured to generate the personalized HRTF for the user using the HRTF calculation system, wherein the server device executes a landmark detection component, a 3D projection component, and an angle and distance measurement component,
wherein the landmark detection component is configured to receive a cropped image set of anthropometric landmarks of the user, and to generate a set of 2D coordinates of the set of anthropometric landmarks of the user from the cropped image set,
wherein the 3D projection component is configured to receive the set of 2D coordinates and a plurality of camera transforms, and to generate a set of 3D coordinates that correspond to the set of 2D coordinates of each of the anthropometric landmarks in 3D space using the camera transforms,
wherein the angle and distance measurement component is configured to receive the set of 3D coordinates, and to generate anthropometric data from the set of 3D coordinates, wherein the anthropometric data correspond to angles and distances of the anthropometric landmarks in the set of 3D coordinates,
wherein the server device is configured to generate the personalized HRTF for the user by inputting the anthropometric data into the HRTF calculation system.

22. The apparatus of claim 13, further comprising:
a server device that is configured to generate the personalized HRTF for the user using the HRTF calculation system, wherein the server device executes at least one of the set of:
a data compilation component, wherein the data compilation component is configured to implement graceful degradation of the anthropometric measurements to fill in a missing portion of the anthropometric measurements using an estimate determined from known portions of the anthropometric measurements;
a dimensionality reduction component, wherein the dimensionality reduction component is configured to reduce a computational complexity of performing the training of the HRTF calculation system by performing principal component analysis on the plurality of HRTFs for the plurality of training subjects;
a photogrammetry component, wherein the photogrammetry component is configured to receive a plurality of structural imagery of the user, to perform a constrained image feature search using a facial landmark detection process on the plurality of structural imagery, and to generate a plurality of camera transforms and a structural image set using a structure-from-motion technique and a result of the constrained image feature search;
a contextual transformation component, wherein the contextual transformation component is configured to receive a first plurality of camera transforms, a plurality of facial landmarks and a scale measure, to translate and rotate the plurality of camera transforms using the plurality of facial landmarks to generate a second plurality of camera transforms, and to scale the second plurality of camera transforms using the scale measure;
a scale measurement component, wherein the scale measurement component is configured to receive range imaging information and to generate a homologue measure using the range imaging information, and wherein the server device is configured to scale structural imagery of the user using the homologue measure; and a cropping component and a landmark detection component, wherein the cropping component and the landmark detection component are coordinated to implement a constrained and recursive landmark search by cropping and detecting multiple different sets of landmarks.

23. The apparatus of claim 13, further comprising:
a user input device associated with a speaker and a microphone; and
a server device that is configured to generate the personalized HRTF for the user using the HRTF calculation system, wherein the server device executes a scale measurement component,
wherein the scale measurement component is configured to receive time of arrival information from the user input device and to generate a homologue measure using the time of arrival information, wherein the time of arrival information is related to a sound output by the speaker at a first location and received by the microphone at a second location, wherein the first location is associated with the user and the second location is associated with the user input device,
wherein the server device is configured to scale structural imagery of the user using the homologue measure.

* * * * *